Dec. 3, 1935.  H. HUEBER ET AL  2,022,885
WINDSHIELD CLEANER
Filed April 18, 1932
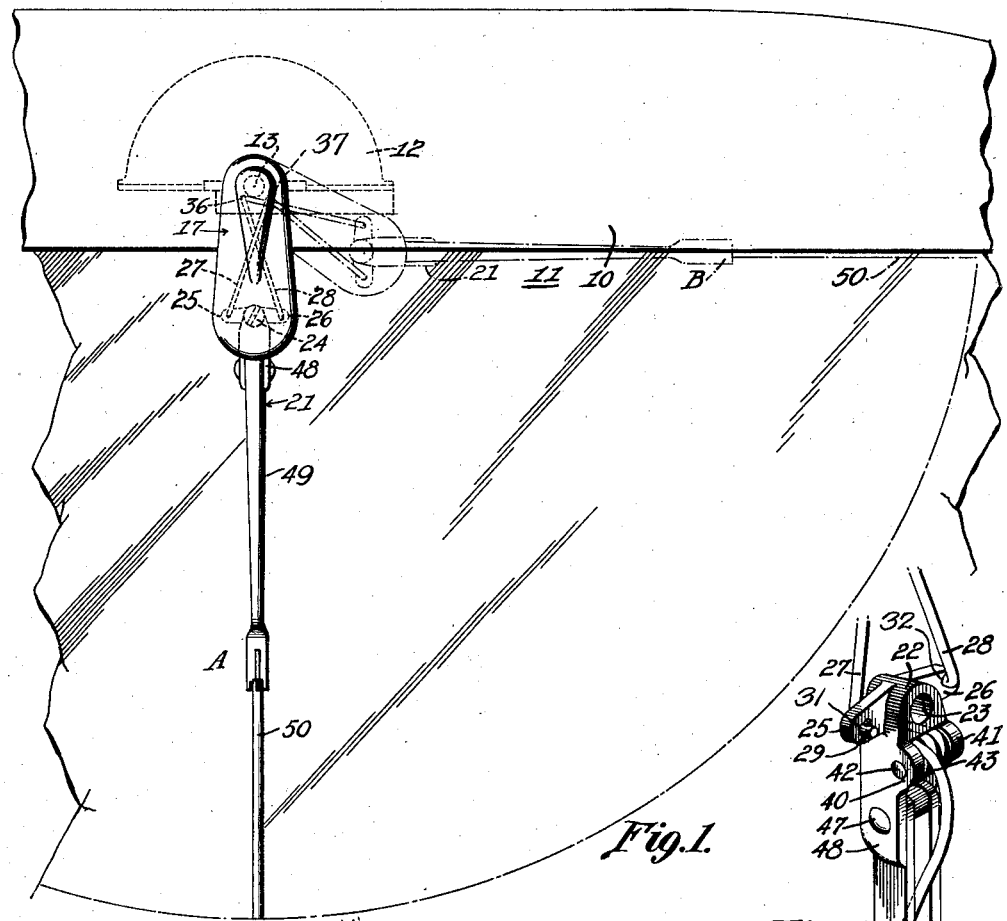
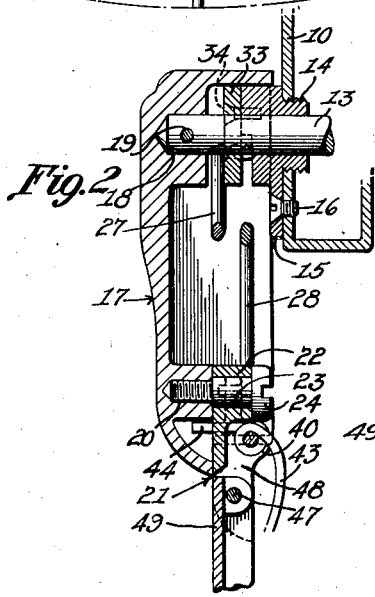
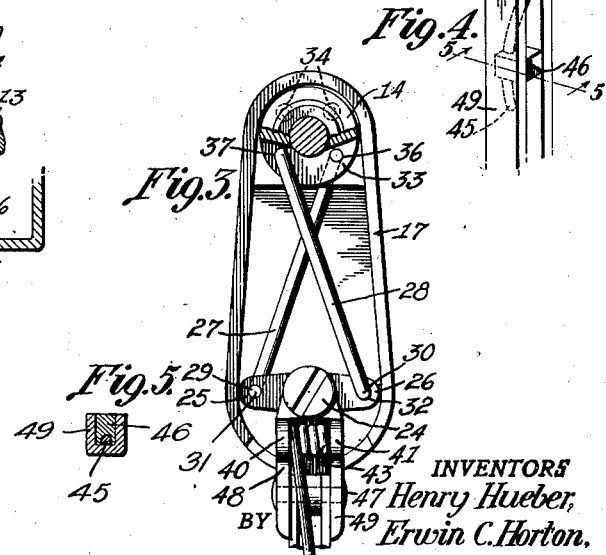
INVENTORS
Henry Hueber,
Erwin C. Horton,
BY Bean & Brooks.
ATTORNEYS Patented Dec. 3, 1935

2,022,885

UNITED STATES PATENT OFFICE 2,022,885

WINDSHIELD CLEANER

Henry Hueber, Buffalo, and Erwin C. Horton, Hamburg, N. Y., assignors to Trico Products Corporation, Buffalo, N. Y.

Application April 18, 1932, Serial No. 606,032

5 Claims. (Cl. 15—255)

The present invention relates to windshield wipers which are mounted adjacent a windshield for movement thereover about a plurality of points to permit movement over and a wiping of a substantial portion of the windshield area.

In the usual windshield wipers which are mounted adjacent a windshield for arcuate movement over a portion of the windshield under the influence of a rotatable shaft to which one end of the windshield wiper arm is attached, incomplete movement of the windshield wiper over and cleansing of the semi-circular portion of the windshield is effected, the portions adjacent the edges of the windshield to which the actuating shaft is attached not being cleansed by such windshield wiper action. The failure to cleanse or wipe these arcuate segments adjacent the edges of the windshield results in an impairment of vision of the driver in directions somewhat advanced and to the sides of the car.

The present invention provides a windshield wiper arm and action wherein the wiper is moved through a modified arcuate path so that where the windshield motor is attached adjacent one edge of the windshield the movement of the wiper and the arm to which it is attached is from a position adjacent one edge of the windshield through a modified arc to another position adjacent the same edge of the windshield and thus effect a complete wiping action whereby the driver or operator of the car is able to observe objects somewhat in advance of and to the side of the car.

The invention also provides a windshield wiper arm which is attachable to the rotatable shaft of a windshield wiper motor, whereby the arm is oscillated with the shaft by the rotation thereof, and whereby the free or movable end of the arm is additionally movable with another point as the arm is moved about the shaft.

The invention also provides a windshield wiper arm wherein the wiping action is produced by rotation about a primary pivot point, while a portion of the windshield wiper arm to which the windshield wiper is attached is simultaneously moved about a secondary pivot which is caused to move simultaneously in modified arcuate fashion about the first pivot point, whereby the portion to which the windshield cleaner is attached moves through a greater arc than the first portion of the windshield wiper arm.

In the drawing:

Fig. 1 illustrates a view in elevation of the present invention attached to an automobile adjacent the windshield thereof.

Fig. 2 is an enlarged fragmentary showing in vertical section.

Fig. 3 is an enlarged fragmentary view of the instant invention in rear elevation.

Fig. 4 is an enlarged fragmentary perspective of the invention.

Fig. 5 is a section on line 5—5 of Fig. 4.

Referring more particularly to the drawing, a portion of a windshield frame of an automobile, such as the header panel adjacent the upper edge of the windshield, is shown at 10 and a windshield 11 such as glass is attached to the frame in any well known manner. A windshield wiper motor 12 is attached adjacent the windshield as for instance to the header panel 10 and is provided with a rotatable shaft 13 which is adapted to oscillate under the influence of the action of motor 12. A stationary member is provided adjacent the shaft 13, as for instance the sleeve member 14 which is secured to the header panel 10 in any desirable fashion, the shaft 13 being rotatable within the sleeve member. The sleeve 14 is provided with an apertured ear 15 through which a suitable screw 16 projects to engage with the header panel 10, thereby preventing rotative movement of the sleeve member.

An arm member 17 is formed at one end with a socket or countersunk portion 18 for the reception of shaft 13 and attachment thereto in any convenient manner, as by means of the screw 19. Arm member 17 is provided with an internally threaded boss 20 to which an extension member 21 may be attached for movement with the arm member 17 and pivotal movement in the plane of movement of the arm member. One end of the extension member 21 is formed with a head portion 22 provided with the aperture 23 through which the screw 24 is inserted and screwed into boss 20 to hold the extension member attached to arm member 17, whereby the extension member is freely rotatable about the screw 24 in the plane of movement of arm member 17 upon rotation of shaft 13 by the windshield wiper motor.

The extension member 21 is formed with laterally extending ears 25 and 26 to which auxiliary guide members or links 27 and 28 are attached by means of bent ends 29 and 30 which are passed through holes 31 and 32 provided in ears 25 and 26, respectively and which are loosely retained therein by swaging the ends of the auxiliary guide members or by attaching in any other convenient fashion. The end 29 of guide member 27 is passed through the hole 31 in ear member 25 toward the windshield 11 while the other end of the auxiliary guide member is pivotally connected upon a stationary portion of the vehicle adjacent the shaft, as for instance to the sleeve 33 attached to sleeve 14 by means of screws 34. This provides a simple means of attachment, but obviously the guide members or links may be otherwise anchored.

In order to effect the pivotal action of the extension 21 about the pivot point or screw 24 link 27 is attached to the ear 25 at one side of a line drawn between the axis of rotation of shaft 13 and pivot 24, while the opposite end of the link is attached upon or adjacent the stationary portion of the device at a position upon the other side of such line. Link 28 is attached at one end to the companion ear 26 while the opposite end of the link is attached to a stationary portion of the device adjacent the shaft 13 as for instance sleeve 33 and on a side of the shaft opposite to the attachment of the auxiliary guide member 27. That is to say, the links 27 and 28 are attached to the ears 25 and 26 respectively and therefore upon opposite sides of the pivot point 24 while the opposite ends of the guide members cross a line drawn between the axis of rotation of the shaft 13 and of the pivot 24 and are pivotally connected at 36 and 37 upon opposite sides of the shaft 13. It will be seen that as the shaft 13 is rotated, as for instance, in a counter-clockwise direction, arm 17 attached to shaft 13 is also moved counter-clockwise. As the arm 17 moves from the position A shown in Fig. 1, in a counter-clockwise direction, the link 27 pivots about the fixed position 36 and causes extension member 21 to turn upon the pivot screw 24 and thus advance in a counter-clockwise direction through an arc which is greater than the arcuate movement of the arm 17.

In the position B as shown in Fig. 1 it is seen that the link 27, upon movement of the shaft in a counter-clockwise direction, tends to turn the extension arm 21 due to the action of the link 27 upon the ear 25 while the link 28 turns the ear 26 similarly in a counter-clockwise direction to aid in the pivotal movement of the extension member 21 about pivot point 24.

The extension member 21 is formed with apertured lugs 40 and 41 for retaining a pin member 42 about which spring 43 is coiled, one end 44 of the spring bearing against boss 20, the other end 45 of the spring being retained by the retaining member 46 located upon a portion of the extension member 21. The extension member 21 is formed in two pieces 48 and 49 connected by the hinge pin 47 so that the remote portion 49 of the extension member 21, will swing in a plane substantially perpendicular to the windshield so that a wiper blade 50 may be readily attached to or removed from the member 21.

The present invention, therefore, provides a windshield wiper arm and a method of wiping a windshield, whereby one portion of the wiper arm is accelerated in arcuate movement over another portion of the arm, the movement of which last portion is derived from rotation of a shaft to which the arm is attached. By the provision of this method of wiping a windshield, the wiper is caused to move through a substantially greater arc than has been obtained heretofore.

What is claimed is:

1. A composite wiper arm comprising an arm having attaching means at one end for attachment to an oscillatable shaft, a wiper carrying arm pivoted on the opposite end of the first arm on an axis parallel to said shaft, and a pair of links having one pair of ends pivotally connected to the wiper carrying arm on opposite sides of its pivot and the opposite pair of ends adapted to be pivotally connected to a fixed member on opposite sides of said shaft with the links in crossed relation to each other; whereby upon limited oscillation of the first arm by said oscillatory shaft the crossed links cause an increased arcuate movement of the second arm about the pivot of the latter in the direction of oscillation of the first arm.

2. A composite wiper arm comprising an arm formed with a socket at one end for attachment to an oscillatable shaft and a pivot at its opposite end, the axes of the socket and pivot lying in the same plane, a wiper carrying arm connected on the pivot for movement with the first arm and movement about the pivot, and a pair of links having angular ends, one pair of said ends being pivotally connected to ears formed on opposite sides of the wiper carrying arm laterally of the pivot axis, and the opposite pair of ends adapted to be pivotally connected to a fixed member at opposite sides of said shaft with the links in crossed relation to each other; whereby upon limited oscillation of the first arm by said oscillatory shaft the crossed links cause an increased arcuate movement of the second arm about the pivot of the latter in the direction of oscillation of the first arm.

3. A cleaner for a windshield glass comprising an arm secured to a shaft for limited oscillating movement therewith in a plane spaced from and parallel to the windshield glass, a pivot on the outer end of the arm, the axis of said pivot and said shaft being parallel, a second arm mounted on the pivot for oscillation with the first arm and oscillation about the axis of the pivot, a third arm pivotally connected to the second arm for movement towards the windshield glass, said third arm carrying a wiper blade on its free end, a spring for pressing the third arm towards the windshield glass, and a pair of crossed links having a pair of adjacent ends pivotally connected to the second arm at opposite sides of said pivot and the opposite pair of ends pivotally connected to fixed points at opposite sides of the shaft, whereby during oscillation of the first and second arms in a given direction the crossed links cause an additional oscillation of the second arm about the pivot in said direction of oscillation thereby causing the wiper blade to oscillate in said direction to limits beyond the limits of oscillation of the first arm thereby cleaning an additional area of the windshield glass.

4. A windshield cleaner comprising a motor, an oscillating shaft operable by said motor, an arm connected to and oscillated by said shaft, a second arm pivoted to said first arm on an axis parallel to said shaft for oscillation therewith and also oscillation about the pivot, a wiper blade operably connected to the second arm for substantially arcuate cleansing movements over a windshield glass, and means for increasing the oscillating movement of the second arm about the pivot over and above the oscillating movement of the first arm and in the direction of oscillation of the first arm, said means including a link connected at one end to a fixed point adjacent said shaft and at its opposite end to said second arm, the two ends of the link being disposed on opposite sides of the plane including the axes of said shaft and pivotal connection between the first and second arm; whereby the increased arcuate movement of the second arm over and above that of the first arm causes the wiper blade to have an increased arcuate cleansing movement over the windshield glass.

5. A windshield cleaner comprising an oscillatory drive shaft, an arm oscillatable therewith, a second arm pivotally supported at its inner end portion on the outer end portion of the first arm for swinging therewith and also for swinging relative thereto in a plane substantially parallel to the plane of movement of the first arm, said second arm having its outer end portion extending outwardly beyond the arcuate path of movement of said first arm and constituting an extension of the latter, wiper means connected to the outer end portion of said second arm, a fixed member disposed adjacent said shaft and held against movement relative to said shaft and arms, and linear transmitting means connecting the inner end portion of said second arm to said fixed member at points respectively on opposite sides of the plane of the axes of said shaft and such pivotal connection between the first and second arms to cause the second arm to swing in the same rotative direction with the first arm by and during swinging movement of the latter.

HENRY HUEBER.
ERWIN C. HORTON.